United States Patent [19]

Myers et al.

[11] Patent Number: 4,635,745
[45] Date of Patent: Jan. 13, 1987

[54] VEHICLE AIR SUSPENSION

[75] Inventors: Philip F. Myers, Stow; Roger A. Strickler; Ivan J. Warmuth, II, both of Akron, all of Ohio

[73] Assignee: The Goodyear Tire & Rubber Company, Akron, Ohio

[21] Appl. No.: 827,707

[22] Filed: Feb. 10, 1986

[51] Int. Cl.⁴ .............................................. F16F 9/04
[52] U.S. Cl. .................................. 280/708; 267/64.24
[58] Field of Search .............. 280/708, 702, 704, 711, 280/712; 267/64.23, 64.24, 64.27

[56] References Cited

U.S. PATENT DOCUMENTS

| 3,042,392 | 7/1962 | Schmitz et al. | 280/708 |
| 3,074,709 | 1/1963 | Ballard et al. | 280/711 |
| 3,300,203 | 1/1967 | Carler et al. | 280/708 |
| 4,588,171 | 5/1986 | Stephens | 267/64.24 |

Primary Examiner—John A. Pekar
Assistant Examiner—Donn McGiehan
Attorney, Agent, or Firm—R. D. Thompson

[57] ABSTRACT

This invention relates to vehicle air suspensions featuring a hydraulic shock absorber mounted completely within an airspring on a pivotal mount which allows relative motion between the shock and the airspring. The preferred form utilizes a two piece airspring piston which has a removable center portion. The shock absorber is mounted on the removable center which allows easy removal and replacement of the shock absorber without disassembly of the airspring.

10 Claims, 2 Drawing Figures

VEHICLE AIR SUSPENSION

BACKGROUND OF THE INVENTION

This invention relates to vehicle suspensions and more particularly to an air suspension featuring a hydraulic shock absorber mounted completely within an airspring on a pivotal mount which allows relative motion between the shock and the airspring.

Air suspension systems in vehicles are well known and generally feature the attributes that vehicle height can be maintained regardless of vehicle load. Some air suspension systems utilize hydraulic shock absorbers as the main structural member with the airspring piston rigidly or rotationally mounted around the shock. While such configurations are generally suitable they require that the shock carry the entire spring load in addition to providing the damping action. This invention allows the airspring to transfer spring loads into the suspension separate from the shock absorber. This invention also features an air suspension in which the shock absorber can freely articulate relative to the movement of the airspring piston. An advantage of the configuration is that the shock and airspring have virtually coincident axes. The air suspension of this invention may preferably include a composite airspring piston in which the pivotal mounting means for attaching the shock body to the piston is affixed to a removable inner portion of the airspring piston. This feature yields the advantage that the hydraulic shock absorber portion may be easily and conveniently changed when the hydraulic shock loses its effectiveness during operation.

A BRIEF DESCRIPTION OF THE INVENTION

The object features advantages of the invention are gained by use of a vehicle air suspension member having a hydraulic shock absorber with an axis of extension having an outer body containing an oil filled reservoir, a rod operatively positioned within said reservoir for coaxial reciprocal movement along the axis of extension, said rod extending axially outward from said outer body of said shock absorber; an airspring having an upper retainer with a bore therethrough for receiving therein the rod, said upper retainer being connected to said rod by a resilient mounting means, an airspring piston axially spaced apart from said upper retainer, a flexible, tubular member sealingly connected at a first end thereof to said airspring piston and at a second end to said upper retainer to form a sealed pneumatic working cavity, and a means for changing pressure within said working cavity, a port connecting said working chamber to the means for changing pressure, said airspring piston having an outer portion and a removable inner core positioned within the outer portion of the piston by a means for sealing, said inner core being attached to the outer body of said hydraulic shock absorber by a means for pivoting the shock absorber relative to said airspring piston during operation of said air suspension.

DETAILED DESCRIPTION OF THE INVENTION

Figure 1:
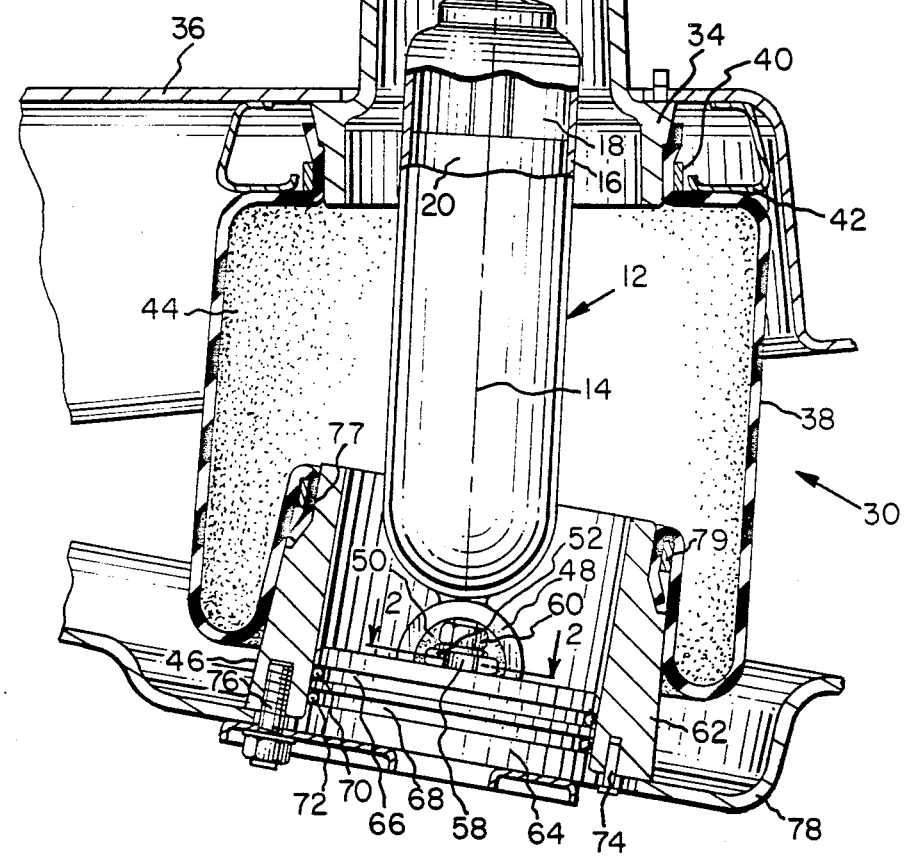
FIG. 1 is an elevational view, partly in section, of an air suspension of the invention.

FIG. 1 shows an air suspension 10 of this invention in which one structural element is a hydraulic shock absorber 12 having an axis of extension 14. The shock absorber 12 is composed of an outer body 16 which is generally illustrated as tubular. Inside of the rigid outer body 16 is contained a hydraulic fluid containing reservoir 18 in which a piston 20 reciprocates axially in the manner of any hydraulic shock. A rod 22 is connected at one end to the piston 20 and extends axially outward from the piston 20 along the axis 14.

The major structural component of the air suspension member 10 is an airspring 30, which includes the components of an upper retainer 32 which can be of any suitable shape which gives the desired volume in the airspring. The upper retainer 32 is shown in its more preferred form of a volume can and is made of any suitable rigid metallic or reinforced plastic material. The upper retainer 32 includes a shoulder 34 which serves several purposes, including the mounting of the airspring to the vehicle structural member 36. The upper retainer shoulder 34 also serves as the periphery against which the flexible member 38 of the airspring is compressibly engaged in order to seal the interface, thus preventing any air leaks. The flexible member 38 is compressed between the upper retainer shoulder 34 and a swage ring 40. An annular spacer collar 42 is also provided. The airspring pneumatic working cavity 44 is formed within the volume enclosed by the upper retainer 32, the flexible member 38 and the piston 46 to form a rolling lobe type airspring assembly 30.

The piston 46 is a unique structure upon which the hydraulic shock absorber 12 is supported and more importantly allowed to pivot independently of the piston 46. This pivoting motion is accomplished by providing a means for pivotal motion, a preferred form of which is shown in FIG. 1.

Figure 2:
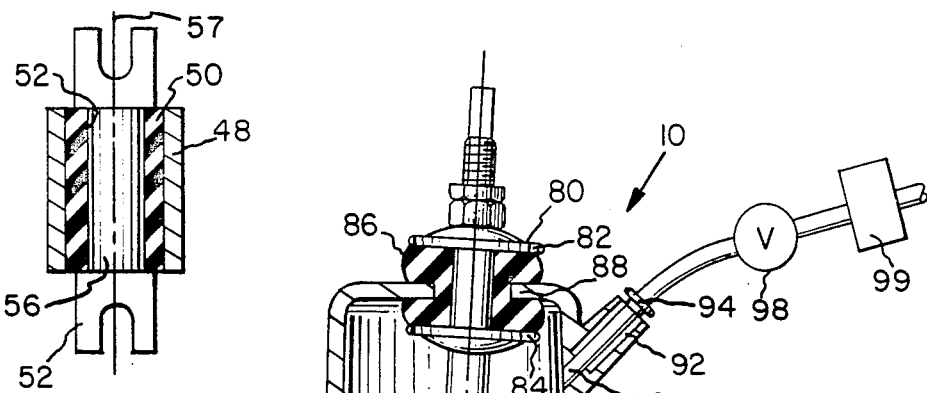
FIG. 2 is an enlarged cross sectional view of the pivot mount portion of FIG. 1 taken along line 2—2.

An eye 48 is integrally and rigidly affixed to the outer body 16 of the shock 12. FIG. 2 shows the eye 48 in greater detail. Within the eye 48 is positioned an elastomeric annular bushing 50 through which a bore 52 is provided. A pin 56 is positioned in the bore 52 of the bushing 50. Retaining bolt 58 with nut 60 are shown as a simple method of assuring that the pin 56 cannot move laterally out of the bore 50. It is desirable that the axis 57 of pin 56 be perpendicular to the plane in which the lower vehicular suspension arm 78 rotates; i.e., that the axis 57 is parallel to the axis of the suspension arm pivot bushings. The piston 46 includes a U-shaped cavity 47 which is adapted to receive the bottom half of eye 48 within the U-shaped cavity mount.

Although piston 46 may be a solid, integrally formed piston, it is shown in FIG. 1 in a preferred form in which the piston 46 is a composite structure including an outer portion 62 and an inner core 64. In this embodiment the inner core 64 is removable from the outer portion 62 of the piston 46 for the express purpose of allowing the shock 12 to be replaced easily. The inner core is provided with annular grooves 66 and 68 into which O rings 70 and 72 are fitted to provide an airtight seal between the outer portion 62 and the inner core 64. Grooves 66 and 68 could alternately be located in 62 and inner core 64 have a smooth periphery. Also the inner bore of 62 and outer shape of 64 can be cylindrical or tapering. Bolts 74 and 76 provide a fastening means to removably position the inner core 64 within the outer portion 62 of the piston.

Bolt 76 also serves to fixedly attach the piston 46 to the unsprung portion 78 of the suspension. The flexible member 38 is sealingly attached around the periphery of the piston 46 by a swage ring 79. Conventional serrations may be employed in the piston peripheral surface 77 to assure an airtight and durable seal.

The rod 22 may be affixed to the upper retainer 32 by any suitable means. A preferred method is shown in which a compression bushing 80 provides the resilient attachment between the upper retainer 32 and the rod 22. The compression bushing 80 consists of annular upper plate 82 and lower plate 84 with a elastomeric bushing 86 positioned between the axially spaced plates 82 and 84. A bore 88 is provided through the upper retainer 32 which is of a greater diameter than the rod 22, but lesser diameter than the plates 82 and 84. The compression bushing 80 acts to allow a small degree of angular and translational motion between the upper retainer 32 and the rod 22 during cycling of the air suspension system 10. Compression bushing 80 also provides an air seal between the rod 22 and the upper retainer 32 to contain the internal high pressure air in cavity 44. Many other suitable mounting configurations can be contemplated which serve to rigidly or preferably resiliently fix the rod 22 to the upper retainer 32. The upper retainer 32 is provided with one or more ports 90 which may be fitted with any suitable valve 94 for the inlet and exhaust of gas to provide means for varying gas pressure within the working cavity 44 of the airspring. It is understood that the means for varying the pressure in the working cavity 44 may include an external pressurized gas source 99 and a two-way pneumatic valve 98 for controlling the gas flow.

The upper retainer 32 and/or rod 22 may be attached to the sprung 36 portions of the suspension, depending on the specific geometry of the suspension in which the air suspension 10 is being utilized. The suspension illustrated is the common short upper arm/longer lower arm (SLA) configuration.

While preferred embodiments of this invention have been shown and described to illustrate the invention, other modifications will become apparent to those skilled in the art. Such modifications shall be within the contemplation of this invention so long as they fall within the scope of this invention as set forth in the following claims.

What is claimed is:

1. A vehicle air suspension member comprising:
   (a) a hydraulic shock absorber with an axis of extension having an outer body containing an oil filled reservoir, a rod operatively positioned within said reservoir for coaxial reciprocal movement along the axis of extension, said rod extending axially outward from said outer body of said shock absorber;
   (b) an airspring having an upper retainer with a bore therethrough for receiving therein the rod, said upper retainer being connected to said rod by a resilient mounting means, an airspring piston axially spaced apart from said upper retainer, a flexible, tubular member sealingly connected at a first end thereof to said airspring piston and at a second end to said upper retainer to form a sealed pneumatic working cavity, and a means for changing pressure within said working cavity, a port connecting said working chamber to said means for changing pressure, said airspring piston being attached to the outer body of said hydraulic shock absorber by a means for pivoting the shock absorber relative to said airspring piston during operation of said air suspension.

2. A vehicle air suspension member according to claim 1 wherein the resilient mounting means is a bushing positioned within said bore of said upper retainer, said bore having a smaller diameter than said bushing, said rod extending through said bushing with said upper retainer compressively engaging the outer periphery of said bushing.

3. A vehicle air suspension member according to claim 2, wherein said bushing further comprises an upper annular plate and lower annular plate axially spaced apart, said upper plate and lower plates having a radii larger than the radius of said bore in said upper retainer such that the upper retainer may move axially between said plates, said rod passing through the upper annular plate and lower annular plate.

4. A vehicle air suspension member according to claim 1 wherein said means for changing pressure is a pneumatic valve positioned within said port in said upper retainer or said airspring piston.

5. A vehicle air suspension member according to claim 1 wherein said means for sealing the inner core within the outer portion of the airspring piston is a plurality of O-rings positioned within a plurality of circumferential grooves provided in an outer peripheral surface of said inner core abutting an inner peripheral surface of said outer portion of the airspring piston.

6. A vehicle air suspension member according to claim 1 wherein said means for pivoting said hydraulic shock absorber relative to said airspring piston is provided by an annular eye rigidly attached to said outer body of said shock absorber having an elastomeric annular bushing centered in said eye, said airspring piston having an attachment means adapted to receive said eye, said eye being held pivotally in said attachment means by a fastening means.

7. A vehicle air suspension member according to claim 1 further comprising a means for affixing said airspring piston to an unsprung portion of a vehicle, and a means for affixing said upper retainer to a sprung portion of said vehicle.

8. A vehicle air suspension member according to claim 1 wherein said tubular flexible member is sealingly attached around said airspring piston and around said upper retainer by swage rings compressively engaging said flexible member against said airspring piston and said upper retainer, said swage rings being located proximate said first end and said second end of said flexible member.

9. A vehicle air suspension member according to claim 1 further comprising: an external pressurized gas source attached to said means for changing pressure within said working cavity and a means for controlling a flow of gas from said external pressurized gas source into said working cavity.

10. A vehicle air suspension member according to claim 1 wherein said airspring having an outer portion and a removable inner core positioned within the outer portion of the piston by a means for sealing, said inner core being attached to the outer body of said hydraulic shock absorber by a means for pivoting the shock absorber relative to said airspring piston during operation of said air suspension.

* * * * *